(12) United States Patent
Kuranoshita

(10) Patent No.: US 12,146,964 B2
(45) Date of Patent: Nov. 19, 2024

(54) IMAGE PROCESSING METHOD, IMAGE PROCESSING APPARATUS, AND IMAGE PROCESSING PROGRAM

(71) Applicant: FUJIFILM Corporation, Tokyo (JP)

(72) Inventor: Masashi Kuranoshita, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 315 days.

(21) Appl. No.: 17/663,805

(22) Filed: May 17, 2022

(65) Prior Publication Data

US 2022/0276387 A1 Sep. 1, 2022

Related U.S. Application Data

(63) Continuation of application No. PCT/JP2020/041656, filed on Nov. 9, 2020.

(30) Foreign Application Priority Data

Dec. 9, 2019 (JP) .................................. 2019-221838

(51) Int. Cl.
*G01S 17/894* (2020.01)
*G06T 7/194* (2017.01)
(Continued)

(52) U.S. Cl.
CPC ............ *G01S 17/894* (2020.01); *G06T 7/194* (2017.01); *G06T 7/521* (2017.01); *B64U 2101/30* (2023.01)

(58) Field of Classification Search
CPC ....... G01S 17/894; G06T 7/194; G06T 7/521; G06T 7/579; G06T 7/593;
(Continued)

(56) References Cited

U.S. PATENT DOCUMENTS

2010/0209013 A1\* 8/2010 Minear ..................... G06T 7/32
382/294
2012/0257016 A1 10/2012 Nakajima et al.
(Continued)

FOREIGN PATENT DOCUMENTS

CN 102737406 A 10/2012
CN 102892017 A 1/2013
(Continued)

OTHER PUBLICATIONS

International Search Report issued in PCT/JP2020/041656; mailed Jan. 26, 2021.
(Continued)

*Primary Examiner* — Samir A Ahmed
(74) *Attorney, Agent, or Firm* — Studebaker & Brackett PC

(57) ABSTRACT

An image processing method includes a step of acquiring, from an image data acquisition device and a three-dimensional data acquisition device that are calibrated, a plurality of pieces of unit image data in which image data and three-dimensional data are associated with each other, for a target object, for each angle of view of the image data acquisition device; a step of estimating a plane, based on a plurality of pieces of three-dimensional data included in the plurality of pieces of unit image data; a step of acquiring image group data by grouping a plurality of pieces of image data included in a plurality of pieces of unit image data belonging to the estimated plane; and a step of selecting image data necessary to form the plane from among the plurality of pieces of image data included in the image group data. Thus, image data can be reduced.

20 Claims, 16 Drawing Sheets

(51) Int. Cl.
*G06T 7/521* (2017.01)
*B64U 101/30* (2023.01)

(58) Field of Classification Search
CPC . G06T 2207/10012; G06T 2207/10016; G06T 2207/10024; G06T 2207/10028; G06T 2207/10032; G06T 2207/30184; G06T 7/12; B64U 2101/30; G01C 11/02; G01B 11/24

See application file for complete search history.

(56) References Cited

U.S. PATENT DOCUMENTS

| | | | |
|---|---|---|---|
| 2013/0181977 A1 | 7/2013 | Tsukagoshi | |
| 2015/0063722 A1* | 3/2015 | Connell, II | G06T 7/521 |
| | | | 382/285 |
| 2018/0075602 A1* | 3/2018 | Shen | G06T 7/62 |
| 2018/0144458 A1* | 5/2018 | Xu | H04N 13/271 |

FOREIGN PATENT DOCUMENTS

| | | |
|---|---|---|
| JP | 2010-256252 A | 11/2010 |
| JP | 2015-114954 A | 6/2015 |
| WO | 2014/147863 A1 | 9/2014 |

OTHER PUBLICATIONS

International Preliminary Report on Patentability (Chapter I) and Written Opinion of the International Searching Authority issued in PCT/JP2020/041656; issued May 17, 2022.

Sanchez Rodriguez Jose Pablo; "Navegacion Autonoma De Un Dron Hexacoptero Con Visionestereoscopica Para Mapeo Y Evasion De Obstaculos En Tiemporeal", Nov. 26, 2018, total 191 pages, https://repositorio.tec.mx/bitstream/handle/11285/632973/tesis.pdf?sequence=3.

Sanchez-Rodriguez Jose-Pablo et al., "Onboard plane-wise 3D mapping using super-pixels and stereo vision for autonomous flight of a hexacopter", Intelligent Service Robotics, vol. 13, No. 2, Jan. 31, 2020, pp. 273-287, Springer.

Teng Xichao et al., "Efficient structure from motion on large scenes using UAV with position and pose information", Proceedings of SPIE, vol. 10615, Apr. 10, 2018, pp. 106153F(1)-106153F(8), SPIE.

Douterloigne Koen et al., "Speeding Up Structure from Motion on Large Scenes Using Parallelizable Partitions", ACIVS 2010, Lecture Notes in Computer Science, vol. 6475, Dec. 13, 2010, pp. 13-21, Springer.

The extended European search report issued by the European Patent Office on May 2, 2023, which corresponds to European Patent Application No. 20897849.4-1210 and is related to U.S. Appl. No. 17/663,805.

An Office Action mailed by China National Intellectual Property Administration on Sep. 2, 2024, which corresponds to Chinese Patent Application No. 202080083365.9 and is related to U.S. Appl. No. 17/663,805; with English language translation.

* cited by examiner

FIG. 1
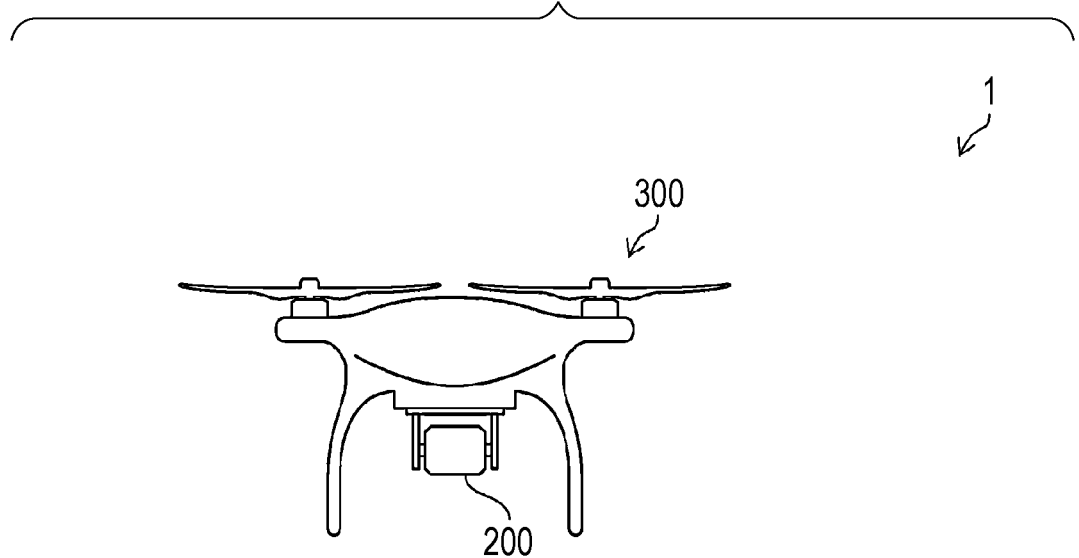
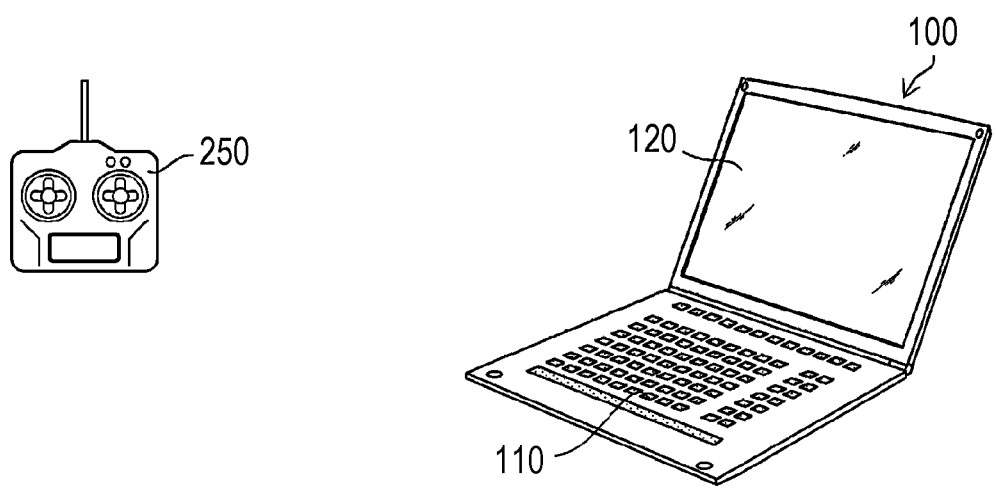

IMAGE PROCESSING METHOD, IMAGE PROCESSING APPARATUS, AND IMAGE PROCESSING PROGRAM

CROSS-REFERENCE TO RELATED APPLICATIONS

This application is a Continuation of PCT International Application No. PCT/JP2020/041656 filed on Nov. 9, 2020, which claims priority under 35 U.S.C. § 119(a) to Japanese Patent Application No. 2019-221838 filed on Dec. 9, 2019. Each of the above application(s) is hereby expressly incorporated by reference, in its entirety, into the present application.

BACKGROUND OF THE INVENTION

1. Field of the Invention

The present invention relates to an image processing method, an image processing apparatus, and a non-transitory computer readable recording medium storing an image processing program.

2. Description of the Related Art

In recent years, techniques have been proposed in which a mobile object such as a drone is provided with a camera, which is used to acquire a captured image of a structure, and a three-dimensional model is generated from the acquired captured image.

For example, JP2015-114954A proposes a technique for acquiring two-dimensional image data of a target object using a mobile object provided with a camera and generating a three-dimensional point group using SfM (Structure from Motion) to generate a three-dimensional model.

SUMMARY OF THE INVENTION

In SfM, a large amount of two-dimensional image data is acquired with imaging ranges overlapped with each other, and a self-position and the coordinates of a target object are estimated to generate a three-dimensional point group of the target object. This requires processing of a large amount of two-dimensional image data and may increase the processing time.

The present invention has been made in view of such a situation, and an object thereof is to provide an image processing method, an image processing apparatus, and a non-transitory computer readable recording medium storing an image processing program that can reduce image data.

An image processing method according to a first aspect includes a step of acquiring, from an image data acquisition device and a three-dimensional data acquisition device that are calibrated, a plurality of pieces of unit image data in which a plurality of pieces of image data and a plurality of pieces of three-dimensional data are associated with each other, for a target object, for each angle of view of the image data acquisition device; a step of estimating a plane, based on the plurality of pieces of three-dimensional data included in the plurality of pieces of unit image data; a step of acquiring image group data by grouping a plurality of pieces of the image data included in a plurality of pieces of the unit image data belonging to the estimated plane; and a step of selecting image data necessary to form the plane from among the plurality of pieces of image data included in the image group data. According to the first aspect, image data can be reduced.

In an image processing method according to a second aspect, the image data and the three-dimensional data are simultaneously acquired. According to the second aspect, acquisition of the image data and the three-dimensional data is facilitated.

In an image processing method according to a third aspect, the three-dimensional data acquisition device includes one of a stereo camera, a laser scanner, or a time-of-flight camera. The third aspect identifies a preferred three-dimensional data acquisition device.

In an image processing method according to a fourth aspect, the plurality of pieces of image data are two-dimensional color image data. The fourth aspect identifies a preferred type of image data.

In an image processing method according to a fifth aspect, the step of estimating a plane includes estimating the plane after segmentation of the plurality of pieces of three-dimensional data. The fifth aspect identifies a preferred plane estimation method.

In an image processing method according to a sixth aspect, the step of selecting image data includes selection based on an overlapping rate of image data for forming the plane. The sixth aspect facilitates selection of image data.

An image processing apparatus according to a seventh aspect includes a unit image data acquisition unit that acquires, from an image data acquisition device and a three-dimensional data acquisition device that are calibrated, a plurality of pieces of unit image data in which a plurality of pieces of image data and a plurality of pieces of three-dimensional data are associated with each other, for a target object, for each angle of view of the image data acquisition device; a plane estimation unit that estimates a plane, based on the plurality of pieces of three-dimensional data included in the plurality of pieces of unit image data; an image group data acquisition unit that acquires image group data by grouping a plurality of pieces of the image data included in a plurality of pieces of the unit image data belonging to the estimated plane; and an image data selection unit that selects image data necessary to form the plane from among the plurality of pieces of image data included in the image group data. According to the seventh aspect, image data can be reduced.

A non-transitory computer readable recording medium storing an image processing program according to an eighth aspect causes a computer to execute the image processing method described above. According to the eighth aspect, the image processing method is executable by a computer.

According to the present invention, image data can be reduced, and an increase in processing time can be avoided.

BRIEF DESCRIPTION OF THE DRAWINGS

FIG. 1 is a diagram conceptually illustrating an image processing system;

DESCRIPTION OF THE PREFERRED EMBODIMENTS

Figure 2:
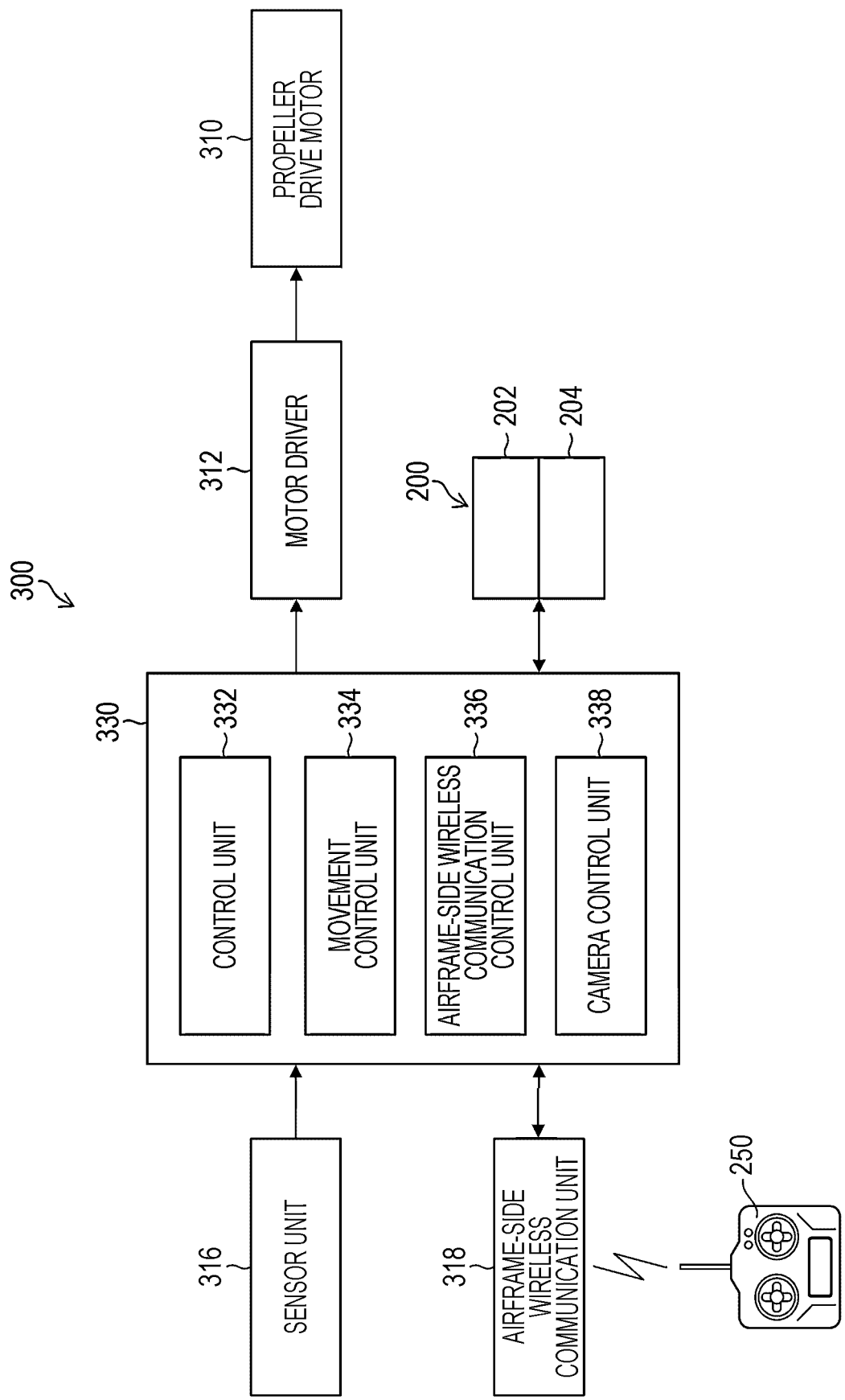
FIG. 2 is a block diagram illustrating functions implemented by a mobile-object microcomputer.

Preferred embodiments of an image processing method, an image processing apparatus, and an image processing program according to the present invention will be described hereinafter with reference to the accompanying drawings.

First Embodiment

FIG. 1 is a diagram conceptually illustrating an image processing system 1 constituted by an image processing apparatus 100 and a mobile object 300. The mobile object 300 is, for example, an unmanned aerial vehicle (UAV). Alternatively, the mobile object 300 may be a self-propelled robot. The mobile object 300 is provided with an imaging device 200. As described below, the imaging device 200 includes an image data acquisition device 202 and a three-dimensional data acquisition device 204 (see FIG. 2). The mobile object 300 flies in the air in accordance with an operation performed by a controller 250. The mobile object 300 acquires a plurality of pieces of unit image data of a target object by using the imaging device 200 provided therein. The unit image data is data in which image data and three-dimensional data are associated with each other. Examples of the target object include structures such as a bridge, a dam, a tunnel, and a building.

The image processing apparatus 100 includes a CPU (Central Processing Unit), a ROM (read-only memory), a RAM (Random Access Memory), and so on and is constituted by a computer. The image processing apparatus 100 includes, for example, an operation unit 110 and a display unit 120. The computer constituting the image processing apparatus 100 functions as the image processing apparatus 100 in response to the CPU executing an image processing program stored in the ROM.

FIG. 2 is a block diagram illustrating a configuration of the mobile object 300. The mobile object 300 includes propeller drive motors 310, a motor driver 312, a sensor unit 316, an airframe-side wireless communication unit 318, and a mobile-object microcomputer 330.

The mobile-object microcomputer 330 includes a control unit 332, a movement control unit 334, a camera control unit 338, and an airframe-side wireless communication control unit 336. The control unit 332 manages all of the respective functions of the movement control unit 334, the airframe-side wireless communication control unit 336, and the camera control unit 338. The mobile-object microcomputer 330 executes a program, thereby being able to function as the control unit 332, the movement control unit 334, the camera control unit 338, and the airframe-side wireless communication control unit 336.

The movement control unit 334 controls the driving of the propeller drive motors 310 through the motor driver 312 to control the flight (movement) of the mobile object 300. The movement control unit 334 controls, based on a control signal transmitted from the controller 250 and information on the flight state of the mobile object 300, which is output from the sensor unit 316, the driving of each of the propeller drive motors 310 to control the flight of the mobile object 300.

The sensor unit 316 detects the flight state of the mobile object 300. The sensor unit 316 is configured to include various types of sensors such as an IMU (inertial measurement unit) and a GNSS (Global Navigation Satellite System). The IMU is configured such that, for example, a gyro sensor, a geomagnetic sensor, an acceleration sensor, a speed sensor, and the like are combined in a plurality of axes. The sensor unit 316 outputs information on the flight state of the mobile object 300, which is detected with the various sensors, to the mobile-object microcomputer 330.

The airframe-side wireless communication unit 318 wirelessly communicates with the controller 250 and transmits and receives various signals to and from the controller 250 under the control of the mobile-object microcomputer 330. For example, when the controller 250 is operated, a control signal based on the operation is transmitted from the controller 250 to the mobile object 300. The airframe-side wireless communication unit 318 receives the control signal transmitted from the controller 250 and outputs the control signal to the mobile-object microcomputer 330.

The mobile-object microcomputer 330 includes a CPU (Central Processing Unit), a ROM (Read Only Memory), and a RAM (Random Access Memory), which are not illustrated, and executes a predetermined program to implement various functions. The program is stored in the ROM.

The camera control unit 338 controls the imaging device 200, based on a control signal transmitted from the controller 250. For example, in response to an instruction from the controller 250 to start imaging, the imaging device 200 can start imaging. In response to an instruction from the controller 250 to terminate imaging, the imaging device 200 terminates imaging.

The airframe-side wireless communication control unit 336 controls communication with the controller 250 through the airframe-side wireless communication unit 318.

A flight plan of the mobile object 300 and imaging conditions of the imaging device 200 can be determined in advance by control software or the like. The flight plan includes, for example, a flight path, a speed, and an altitude of the mobile object 300. The imaging conditions include causing the imaging device 200 to perform imaging at equal time intervals and to perform imaging at equal distance intervals, and the like. Conditions such as equal time intervals and equal distance intervals are appropriately selected. The control unit 332 controls the movement control unit 334 in accordance with the flight plan. The movement control unit 334 controls the driving of the propeller drive motors 310 through the motor driver 312 in accordance with a signal from the control unit 332. The control unit 332 controls the camera control unit 338 in accordance with the imaging conditions. The camera control unit 338 controls the imaging device 200. The flight plan and the imaging conditions are combined to determine an overlap rate of imaging ranges along a flight path and a sidelap rate of imaging ranges in adjacent flight paths.

Figure 3:
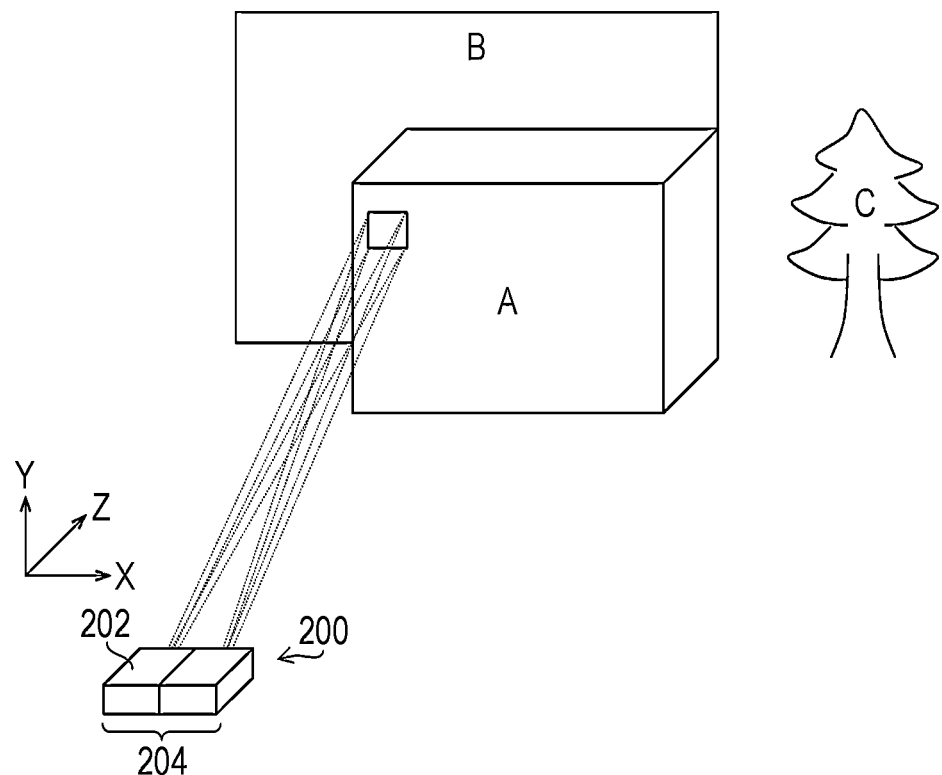
FIG. 3 is a conceptual diagram illustrating imaging of a target object by using an image data acquisition device and a three-dimensional data acquisition device.

FIG. 3 is a conceptual diagram of imaging of a target object by an imaging device including an image data acquisition device and a three-dimensional data acquisition device. The imaging device 200 includes the image data acquisition device 202 and the three-dimensional data acquisition device 204. The target object includes structures A and B having a planar shape, and a structure C having no plane. The image data acquisition device 202 acquires two-dimensional image data of the target object. The image data acquisition device 202 includes an imaging element such as a CMOS (Complementary Metal Oxide Semiconductor) imaging element (not illustrated). The imaging element has a plurality of pixels constituted by photoelectric conversion elements arranged two-dimensionally in an x direction (horizontal direction) and a y direction (vertical direction), and color filters (not illustrated) are arranged on an upper surface of the plurality of pixels such that, for example, R (red), G (green), and B (blue) filters are arranged two-dimensionally in a Bayer pattern. In an embodiment, the image data acquisition device 202 is capable of acquiring two-dimensional color image data. The image data acquisition device 202 acquires image data for each angle of view through each imaging operation. The imaging range is determined by the angle of view of the image data acquisition device 202. The image data acquisition device 202 acquires a plurality of pieces of image data for the target object. The angle of view represents an imaging range in which imaging is performed by the image data acquisition device 202.

The three-dimensional data acquisition device 204 acquires three-dimensional data of the target object. The three-dimensional data acquisition device 204 is, for example, a stereo camera. The stereo camera is a camera that simultaneously captures image data from a plurality of cameras located at different positions and acquires three-dimensional data up to the target object by using parallax in the image data. When the three-dimensional data acquisition device 204 is a stereo camera, one of a plurality of cameras can be used as the image data acquisition device 202. The image data acquisition device 202 can be provided separately from the three-dimensional data acquisition device 204.

The case where the three-dimensional data acquisition device 204 is a stereo camera has been described. The three-dimensional data can be acquired using a laser scanner or a time-of-flight (ToF) camera.

The laser scanner emits a laser pulse to a target object and measures a distance by the time taken for the laser pulse reflected at the surface of the target object to return. Then, three-dimensional data of the reflection point of the laser pulse is acquired from the measured distance and angle information of the emission direction of the laser pulse. That is, the three-dimensional data includes three-dimensional coordinates. The laser scanner is not limited to one based on the time-of-flight method, and can use a phase difference method or a trigonometric method to acquire three-dimensional data.

The time-of-flight camera is a camera that measures a flight time of light to acquire three-dimensional data.

Figure 4:
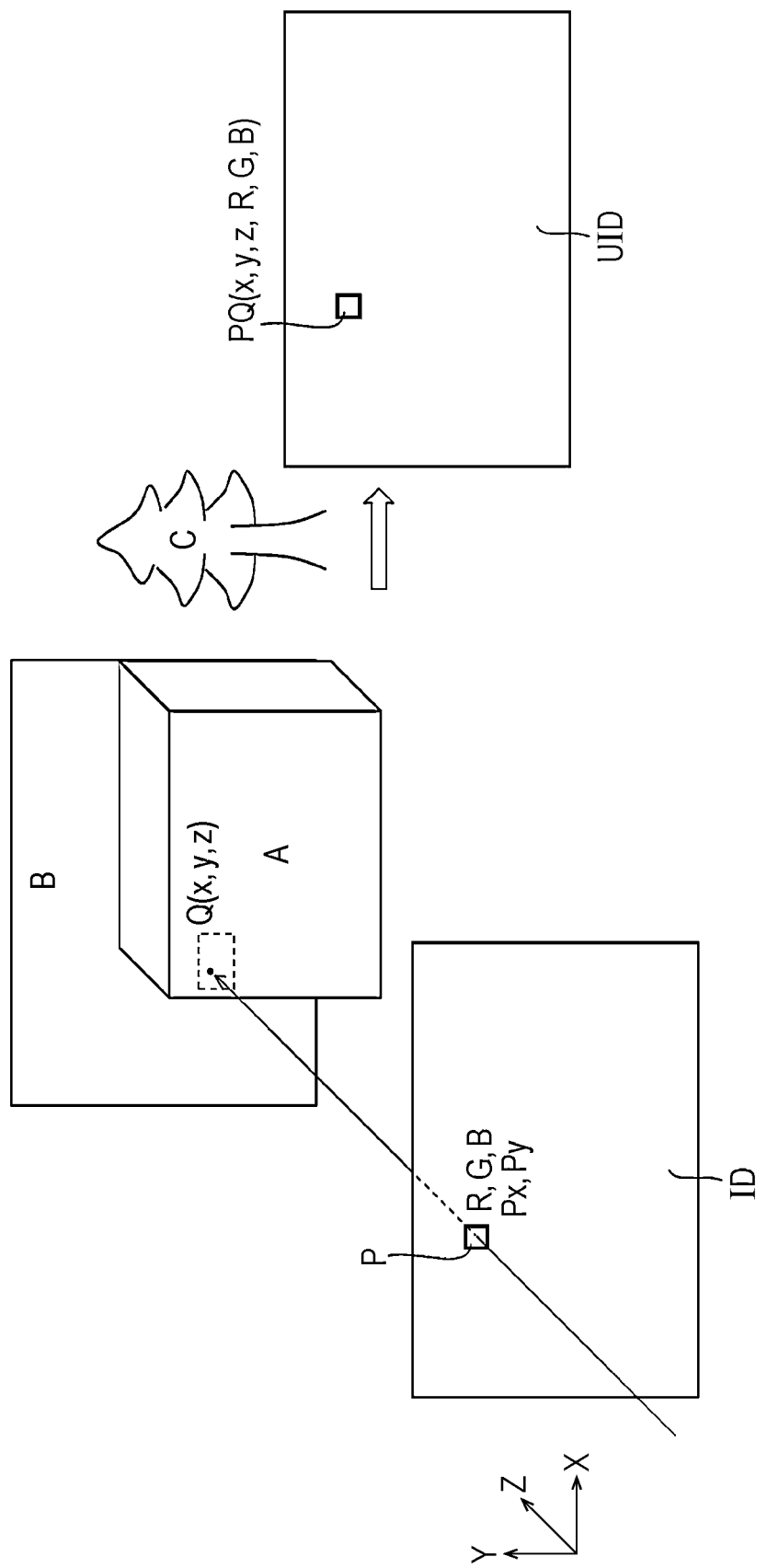
FIG. 4 is a conceptual diagram describing a correspondence relationship between image data and three-dimensional data.

FIG. 4 is a conceptual diagram describing a correspondence relationship between image data and three-dimensional data. Image data ID includes data of a plurality of pixels P that are two-dimensionally arranged. The image data ID is data of an angle-of-view range. The pixels P have respective values for R, G, and B. FIG. 4 illustrates a pixel P at coordinates (Px, Py) in the image data ID, and a point Q having a positional relationship corresponding to the pixel P for the target object. The point Q has three-dimensional data (x, y, z), which is position information. Since the image data acquisition device 202 and the three-dimensional data acquisition device 204 are calibrated, the pixel P and the point Q are associated with each other. Unit image data UID in which pixels of the image data ID and three-dimensional data are associated with each other is acquired. Each piece of data PQ of the unit image data UID has the three-dimensional data (x, y, z) of the point Q and information on the values (R, G, B) of the pixel P. The imaging device 200 provided in the mobile object 300 acquires a plurality of pieces of unit image data UID for the target object in accordance with the flight plan and the imaging conditions. The image data and the three-dimensional data, which are included in the unit image data UID, are preferably acquired simultaneously. The association between the image data and the three-dimensional data is facilitated.

Figure 5:
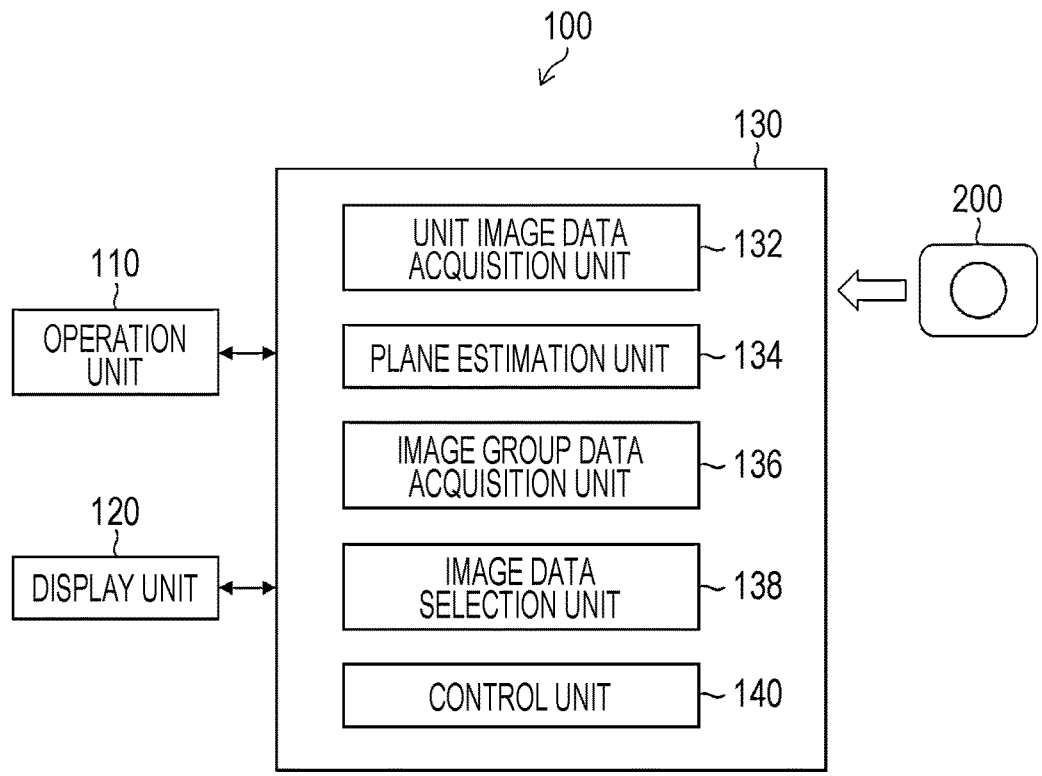
FIG. 5 is a block diagram illustrating functions implemented by a processing apparatus microcomputer.

FIG. 5 is a block diagram illustrating a configuration of the image processing apparatus 100. The image processing apparatus 100 includes the operation unit 110, the display unit 120, and a processing apparatus microcomputer 130. The processing apparatus microcomputer 130 includes a unit image data acquisition unit 132, a plane estimation unit 134, an image group data acquisition unit 136, an image data selection unit 138, and a control unit 140. The control unit 140 manages all of the respective functions of the unit image data acquisition unit 132, the plane estimation unit 134, the image group data acquisition unit 136, and the image data selection unit 138. The processing apparatus microcomputer 130 executes an image processing program, thereby being able to function as the unit image data acquisition unit 132, the plane estimation unit 134, the image group data acquisition unit 136, the image data selection unit 138, and the control unit 140.

The unit image data acquisition unit 132 acquires a plurality of pieces (a large amount) of unit image data UID acquired by the imaging device 200 through an apparatus input/output unit (not illustrated). The plurality of pieces of unit image data UID are obtained through imaging of the target object with overlapping and sidelapping in accordance with the flight plan and the imaging conditions.

The plane estimation unit 134 estimates a plane, based on a plurality of pieces of three-dimensional data included in the plurality of pieces of unit image data UID. The estimation of a plane includes estimating a plane after segmentation of the plurality of pieces of three-dimensional data.

The segmentation extracts a plurality of pieces of independent three-dimensional data as a three-dimensional data cluster, and estimates a plane. For example, a certain piece of three-dimensional data is selected from among the plurality of pieces of three-dimensional data, and a piece of three-dimensional data near the certain piece of three-dimensional data is detected. Pieces of three-dimensional data are detected one after another to form a segment, and one plane is estimated. The plane is classified as a segment. A number of segments equal to the number of planes included in the target object are formed.

The three-dimensional data and the unit image data UID are associated with each other. That is, the unit image data UID to which the three-dimensional data belongs and the three-dimensional data included in the unit image data UID are extractable from each other.

The image group data acquisition unit 136 acquires image group data by grouping a plurality of pieces of image data ID included in a plurality of pieces of unit image data UID belonging to the estimated plane.

From three-dimensional data estimated to belong to one plane, unit image data UID to which the three-dimensional data belongs is extracted. A plurality of pieces of image data ID included in the extracted unit image data UID are grouped. The image group data acquisition unit 136 acquires the grouped image data ID as image group data constituting one plane.

The image data selection unit 138 selects a number of pieces of image data ID necessary to form a plane from among the plurality of pieces of image data ID included in the image group data. The imaging device 200 provided in the mobile object 300 acquires a large amount of image data ID on the assumption that a three-dimensional point group is created using SfM or the like. However, a large amount of image data ID causes an increase in processing time.

On the other hand, when the surface shape of the target object is estimated to be a plane, a number of pieces of image data ID necessary to form a plane is selected without using a large amount of image data ID belonging to the image group data. As a result, the image data ID is reduced. Accordingly, reducing the image data ID can reduce, for example, the processing time taken to create a three-dimensional point group.

Figure 6:
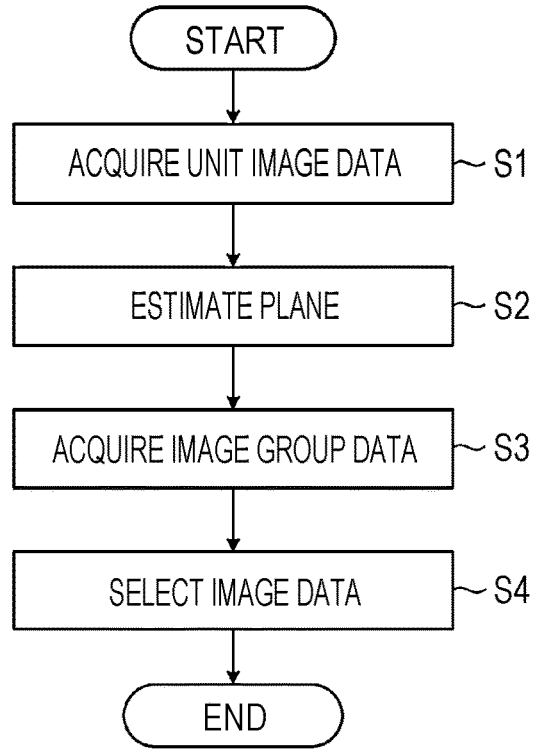
FIG. 6 is a flowchart describing an image processing method using an image processing apparatus.

FIG. 6 is a flowchart describing an image processing method using an image processing apparatus. The image processing method includes a unit image data acquisition step (step S1), a plane estimation step (step S2), an image group data acquisition step (step S3), and an image data selection step (step S4).

(Unit Image Data Acquisition Step)

In the unit image data acquisition step, from an image data acquisition device and a three-dimensional data acquisition device that are calibrated, a plurality of pieces of unit image data in which image data and three-dimensional data are associated with each other are acquired, for a target object, for each angle of view of the image data acquisition device (step S1).

Figure 7:
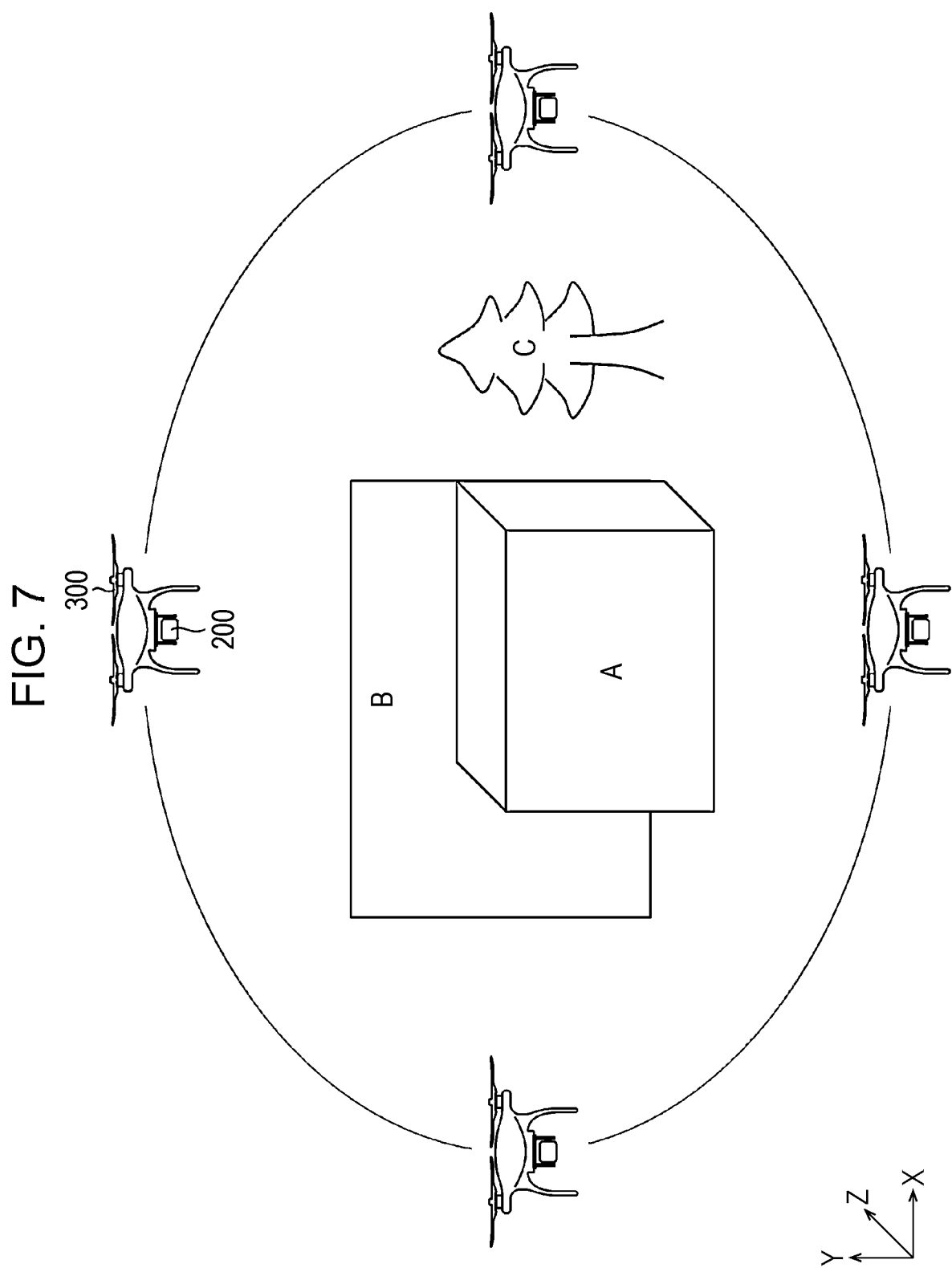
FIG. 7 is a diagram conceptually illustrating how an imaging device provided in a mobile object performs imaging of a target object.
Figure 8:
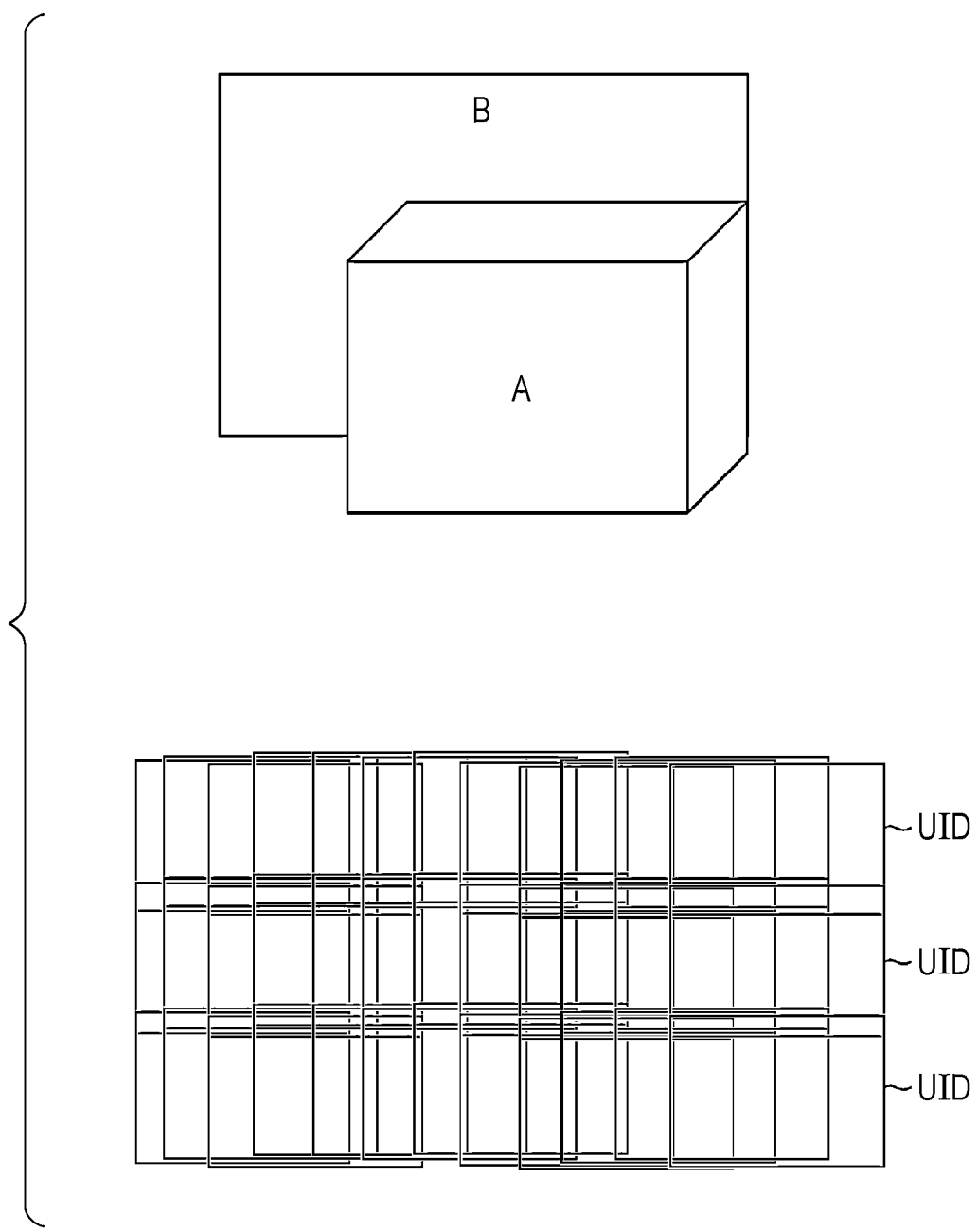
FIG. 8 is a diagram conceptually illustrating a plurality of pieces of acquired unit image data.

As illustrated in FIG. 7, the mobile object 300 provided with the imaging device 200 flies around the target object in accordance with the flight plan. The image data acquisition device 202 (not illustrated) and the three-dimensional data acquisition device 204 (not illustrated), which are included in the imaging device 200, perform imaging of the target object in accordance with the imaging conditions and acquire a plurality of pieces of unit image data UID. FIG. 8 illustrates an example of a portion of a large amount of unit image data UID acquired by the image data acquisition device 202 and the three-dimensional data acquisition device 204. As illustrated in FIG. 8, the imaging device 200 performs imaging of a surface of the structure A and a surface of the structure B in the target object. The plurality of pieces of unit image data UID include unit image data UID obtained by performing imaging of the surface of the structure A and the surface of the structure B in the target object. The unit image data UID is acquired for each angle of view of the image data acquisition device 202.

(Plane Estimation Step)

Figure 9:
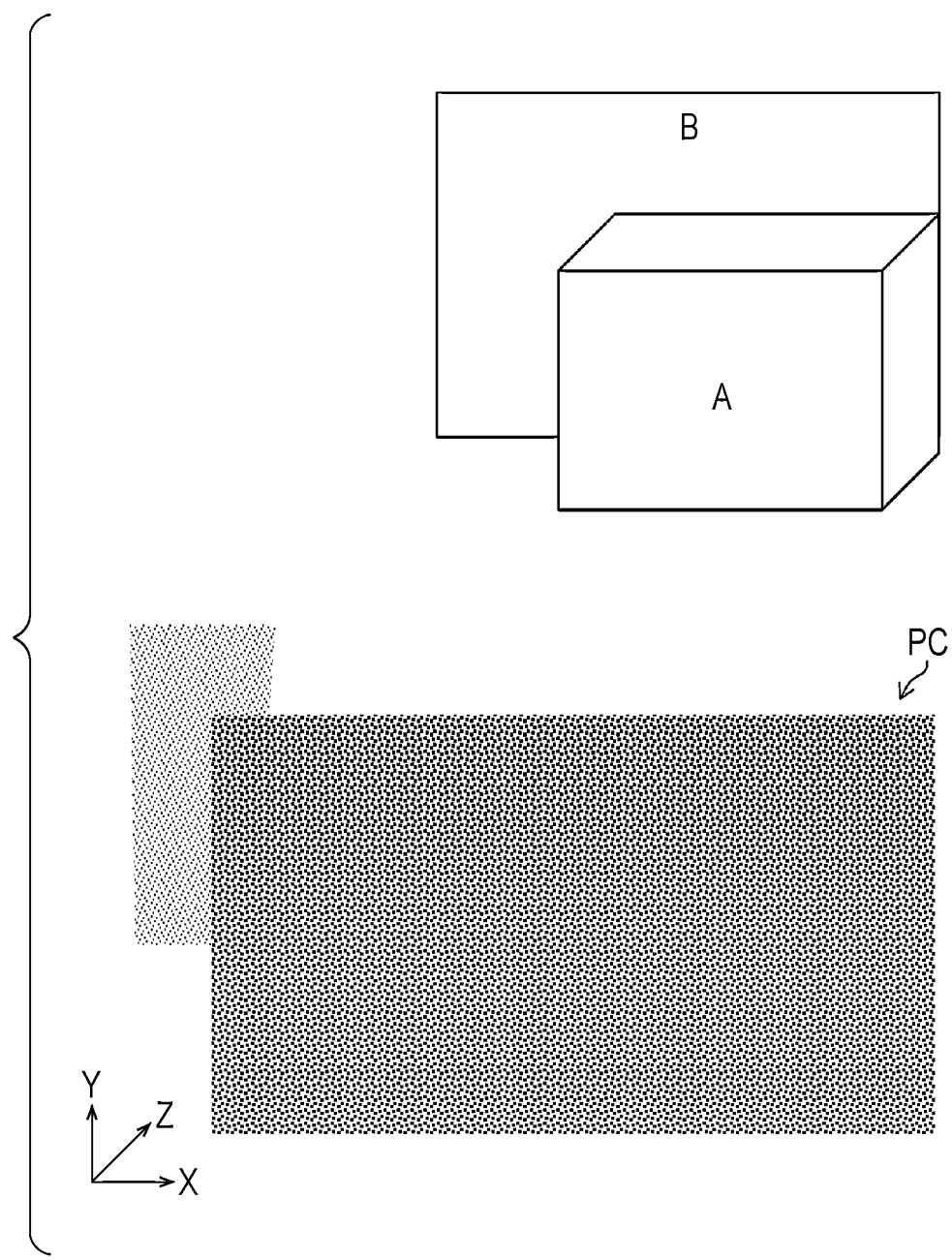
FIG. 9 is a conceptual diagram of three-dimensional data plotted on XYZ coordinates.
Figure 10:
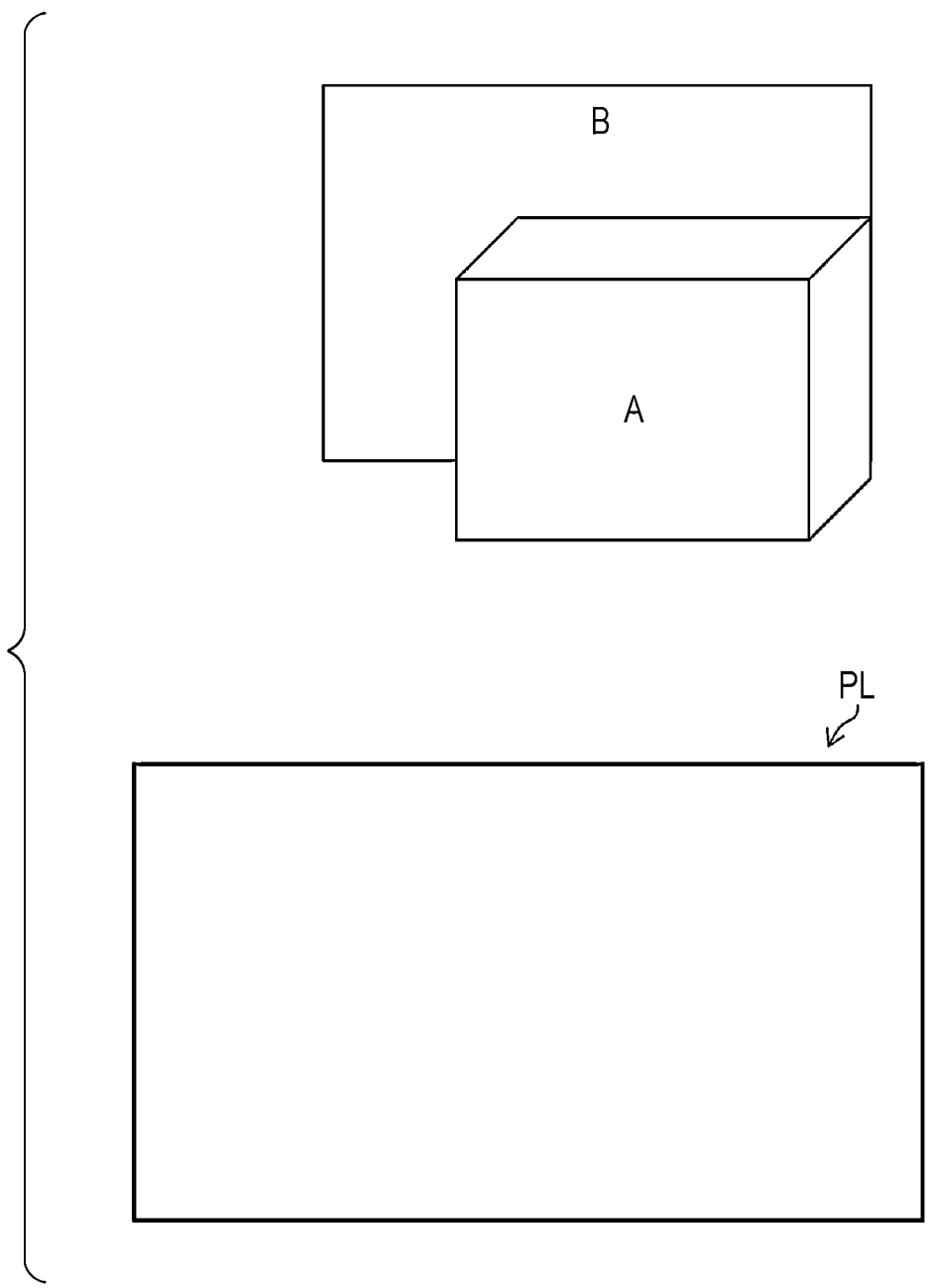
FIG. 10 is a diagram illustrating estimation of a plane from a plurality of pieces of three-dimensional data.

In the plane estimation step, a plane is estimated based on a plurality of pieces of three-dimensional data included in the plurality of pieces of unit image data UID (step S2). Three-dimensional data has information of (x, y, z). The pieces of three-dimensional data included in the plurality of pieces of unit image data UID are plotted in the XYZ coordinate system in a manner as illustrated in FIG. 9, for example. As illustrated in a point group PC in FIG. 9, if the pieces of three-dimensional data are on the same plane, the values of the z coordinate fall within a certain range, and the pieces of three-dimensional data can be recognized as a cluster. For example, a plurality of pieces of three-dimensional data are segmented centered on any piece of three-dimensional data included in the point group PC. As a result, a plane can be estimated. The estimation of a plane is not limited to segmentation. Then, as illustrated in FIG. 10, the surface of the structure A is estimated as a plane PL from the plurality of pieces of three-dimensional data, that is, from the point group PC.

(Image Group Data Acquisition Step)

Figure 11:
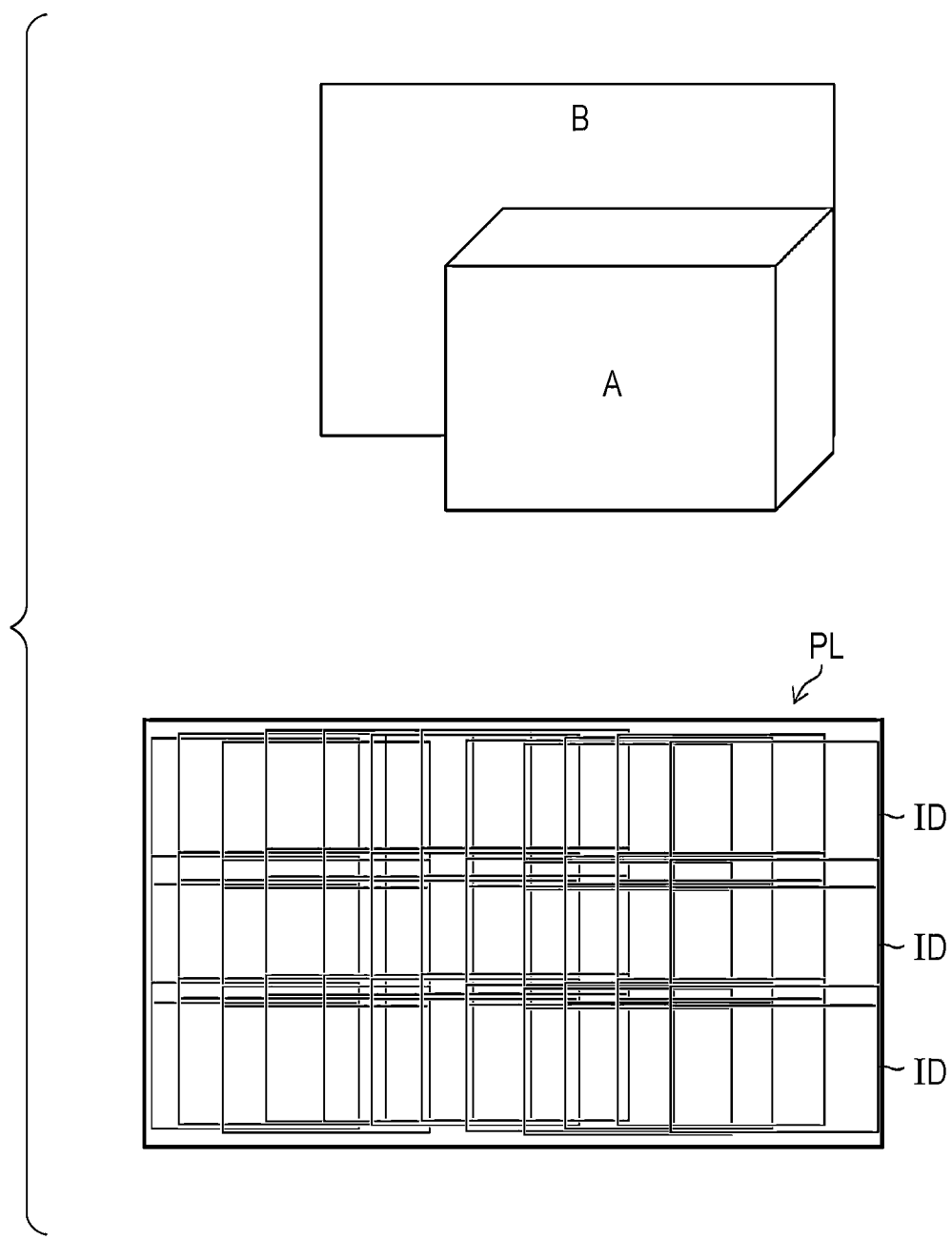
FIG. 11 is a diagram conceptually illustrating acquisition of image group data.

In the image group data acquisition step, a plurality of pieces of image data ID included in the plurality of pieces of unit image data UID belonging to the estimated plane PL are grouped to acquire image group data (step S3). Grouping is implemented by assigning attribute data (for example, PL) to the plurality of pieces of image data ID, indicating that the plurality of pieces of image data ID belong to the plane PL, and associating the image data ID with the plane PL. As illustrated in FIG. 11, the plurality of pieces of image data ID belonging to the plane PL are grouped and acquired as image group data.

Since the image data ID and three-dimensional data included in the image data ID are associated with each other, the image group data also includes the unit image data UID.

(Image Data Selection Step)

Figure 12:
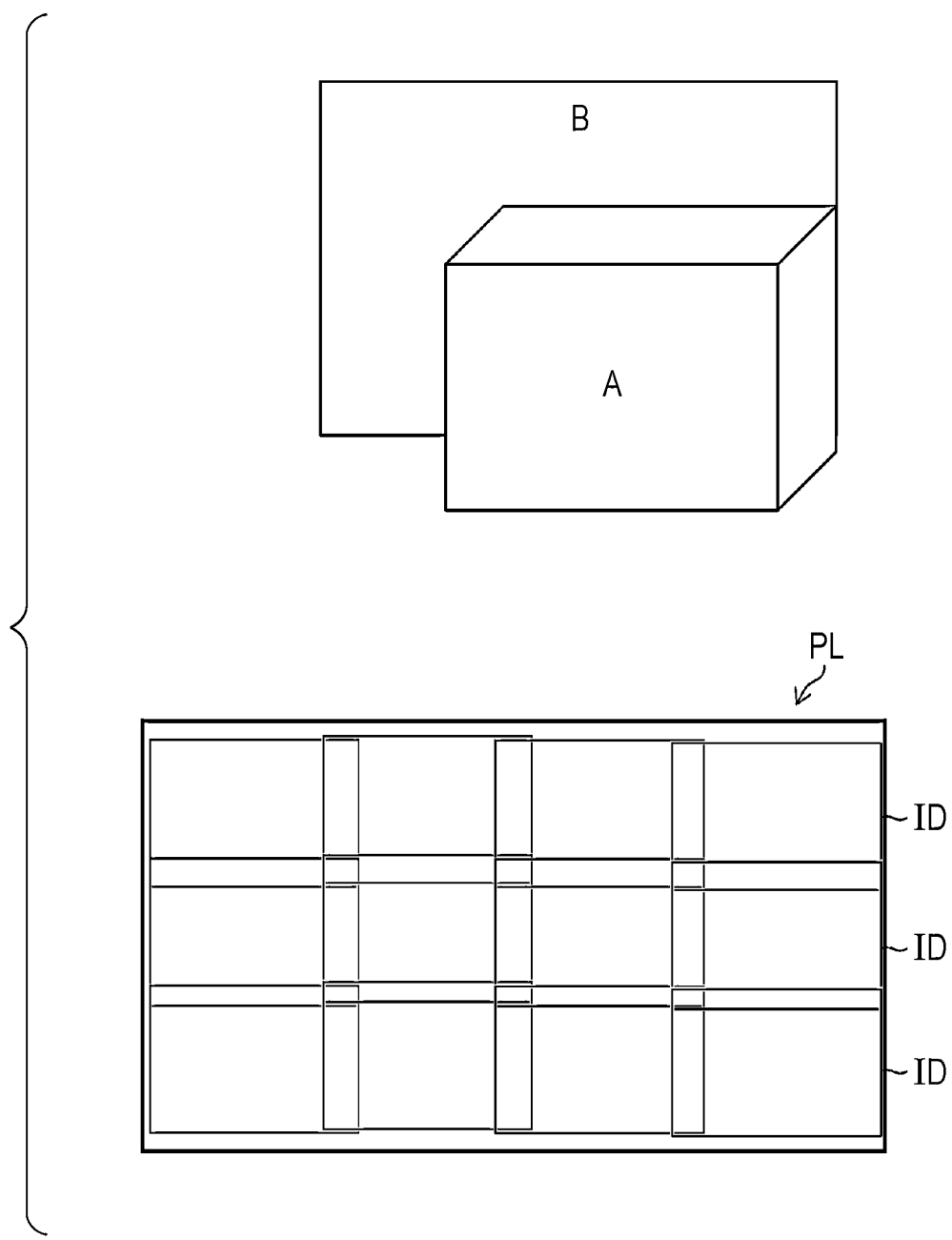
FIG. 12 is an explanatory diagram of grouping of image data to acquire image group data.

In the image data selection step, image data ID necessary to form the plane PL is selected from among the plurality of pieces of image data ID included in the image group data (step S4). As illustrated in FIG. 11, the plane PL includes a large amount of image data ID. On the other hand, since the surface shape of the structure A in the target object is estimated to be the plane PL, as illustrated in FIG. 12, a number of pieces of image data ID necessary to form the plane PL can be selected from among the plurality of pieces of image data ID. With comparison between FIG. 11 and FIG. 12, it can be conceptually understood that the image data ID can be reduced. Reducing the image data ID to be used can reduce the processing time for performing processing using the image data ID.

The step of selecting image data includes selection based on the overlapping rate of pieces of image data ID to be used to form the plane PL. For example, the overlapping rate is an overlap rate and/or a sidelap rate.

Selection based on the overlapping rate means that, for example, the overlap rate of pieces of image data ID for selecting the pieces of image data ID is made lower than the overlap rate when the pieces of image data ID are acquired. Specifically, selection is performed such that, for example, the overlap rate of a plurality of pieces of image data ID is 30% in the image selection step when the overlap rate when the plurality of pieces of image data ID are acquired is 90%. These numerical values are examples, and the present invention is not limited to these numerical values. In addition to the overlap rate, the sidelap rate may also be reduced.

(Creation of Three-Dimensional Point Group)

Figure 13:
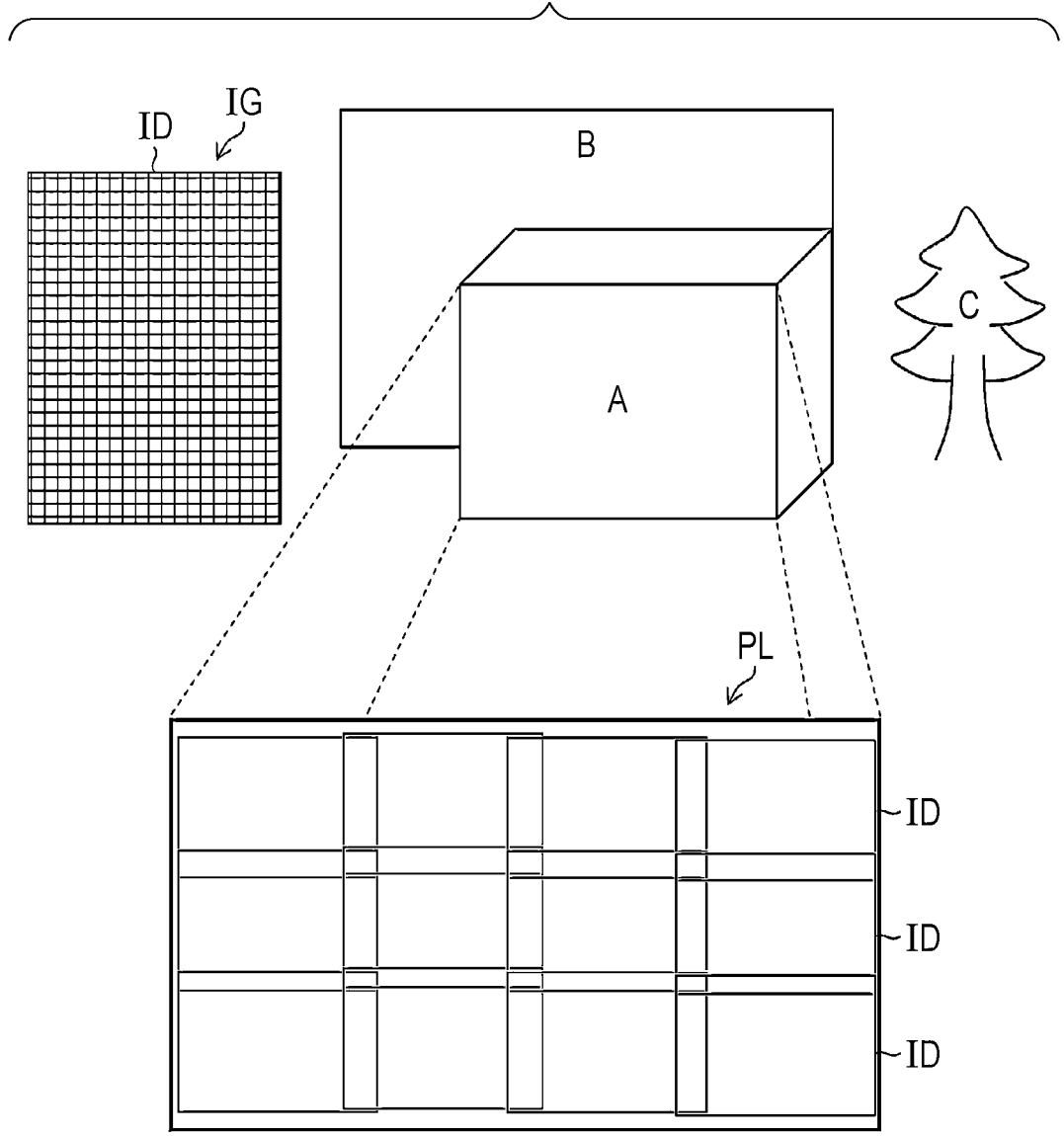
FIG. 13 is a diagram describing creation of a three-dimensional point group.

Next, a procedure for creating a three-dimensional point group using the reduced image data ID will be described. In the following embodiment, as illustrated in FIG. 13, it is assumed that the plane PL is estimated for a portion of the structure A. Pieces of image data ID necessary to form the plane PL are selected. For a portion of the structure A other than the plane, an image group IG including a plurality of pieces of the image data ID necessary for SfM is acquired by the imaging device 200 of the mobile object 300.

Figure 14:
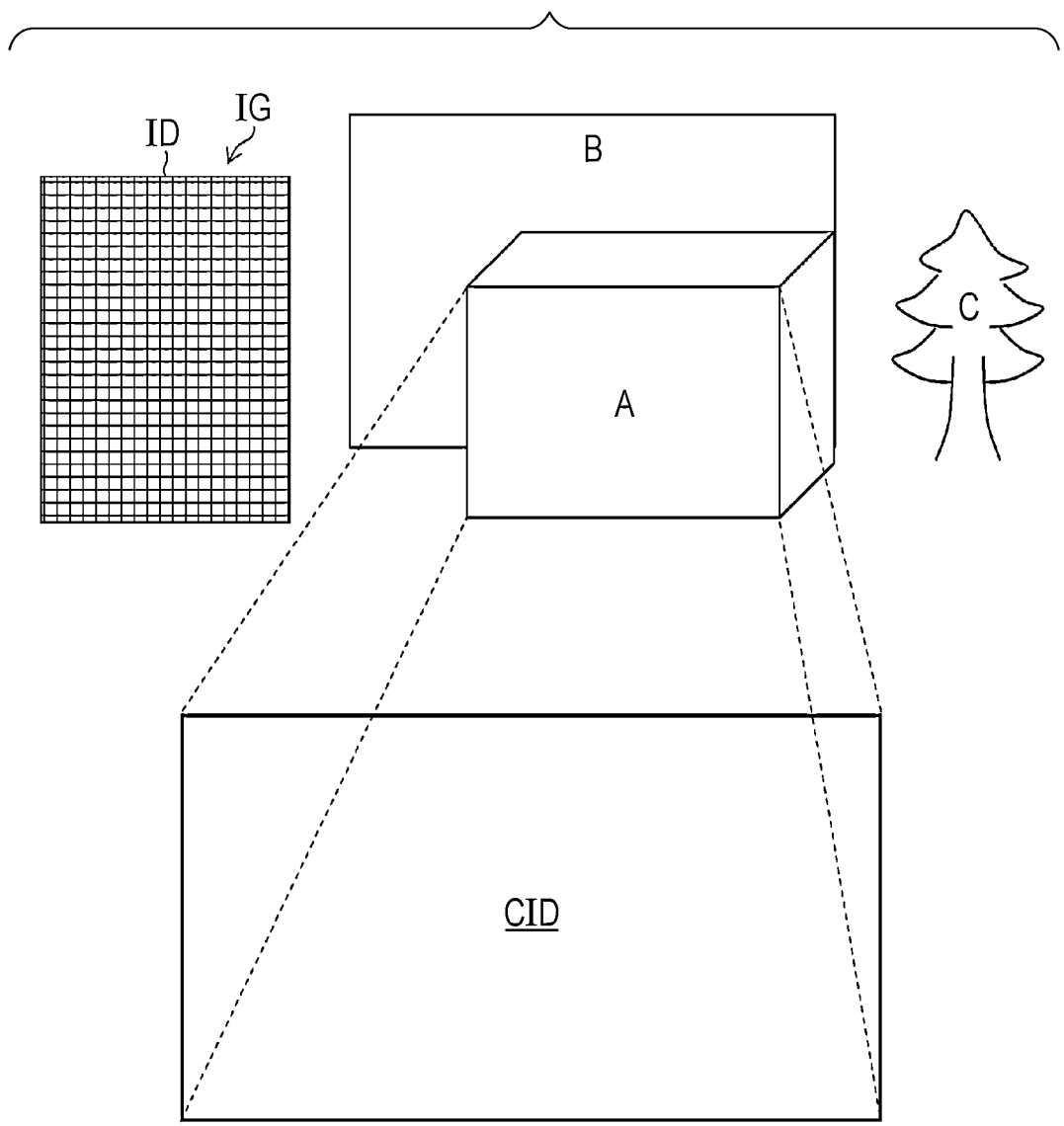
FIG. 14 is a diagram describing creation of a three-dimensional point group.

Then, as illustrated in FIG. 14, the pieces of image data ID necessary to form the plane PL are combined. As a result, composite image data CID corresponding to the plane of the structure A can be created. The composite image data CID can be created using pattern matching, namely, block matching. In the block matching, a block having a predetermined size is set for one of the pieces of image data ID, and the block is scanned across the other pieces of image data ID to calculate correlation values. Then, a portion having a highest correlation value is determined as a location that overlaps the block, and adjacent pieces of image data ID are coupled and combined. Since the plane PL is estimated, the pieces of image data ID can accurately be coupled and combined to obtain the composite image data CID.

Figure 15:
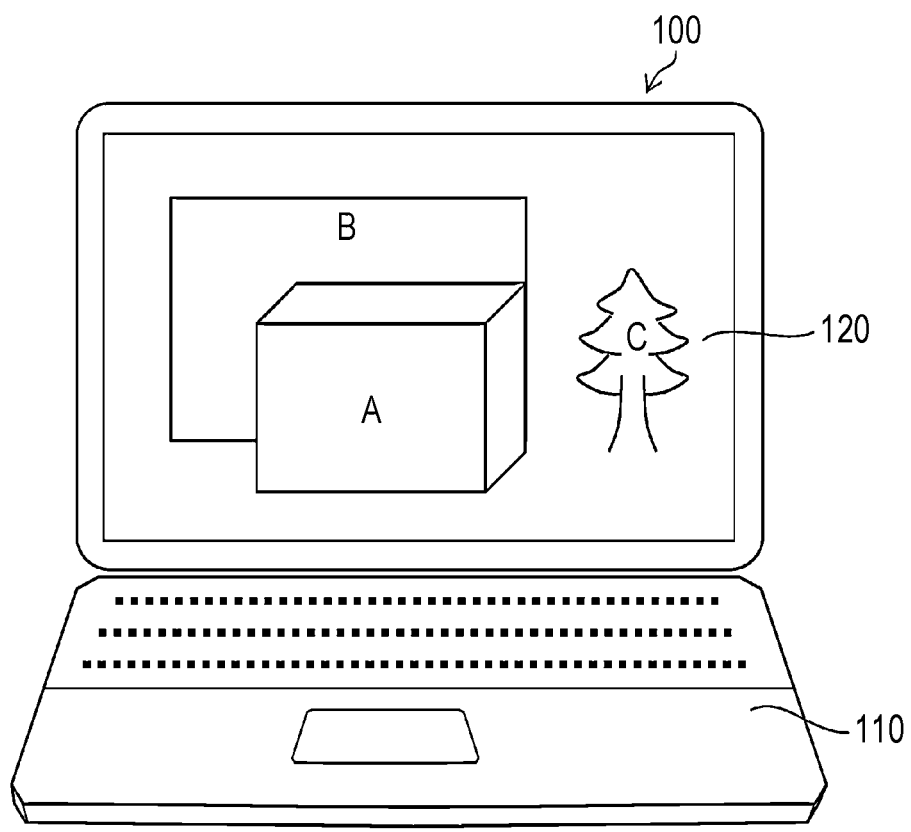
FIG. 15 is a diagram illustrating the image processing apparatus on which a three-dimensional point group is displayed.

Finally, the image-capturing position, the posture, and the coordinates of the target object are estimated from the image group IG by using SfM. Further, MVS (Multi-view Stereo) processing is performed to increase the density, and a three-dimensional point group is created. The image group IG does not include a portion corresponding to the plane PL. Accordingly, the composite image data CID is arranged using point group information that is obtained by SfM and that is adjacent to the plane PL. As a result, as illustrated in FIG. 15, three-dimensional point groups corresponding to the target object can be created. In an embodiment, the image group IG and the composite image data CID are subjected to SfM processing to create a three-dimensional point group.

In SfM, feature points included in areas where the pieces of image data ID of the image group IG overlap are extracted, and a correspondence relationship of the feature points between the pieces of image data ID is identified.

Known local feature values robust to scaling (different imaging distances), rotation, and the like between the pieces of image data ID include a SIFT (Scale-invariant feature transform) feature value, a SURF (Speed-Upped Robust Feature) feature value, and an AKAZE (Accelerated KAZE) feature value. The number of correspondence points (the number of sets) having matching feature values is preferably several tens or more, and therefore the overlap rate and/or the sidelap rate between the pieces of image data ID in the image group IG is preferably large.

Second Embodiment

Next, a second embodiment will be described. Also in the second embodiment, the image processing method illustrated in FIG. 6 including the unit image data acquisition step (step S1), the plane estimation step (step S2), the image group data acquisition step (step S3), and the image data selection step (step S4) is executed by the image processing apparatus 100. Creation of a three-dimensional point group, which is different from that in the first embodiment, will be described.

(Creation of Three-Dimensional Point Group)

Figure 16:
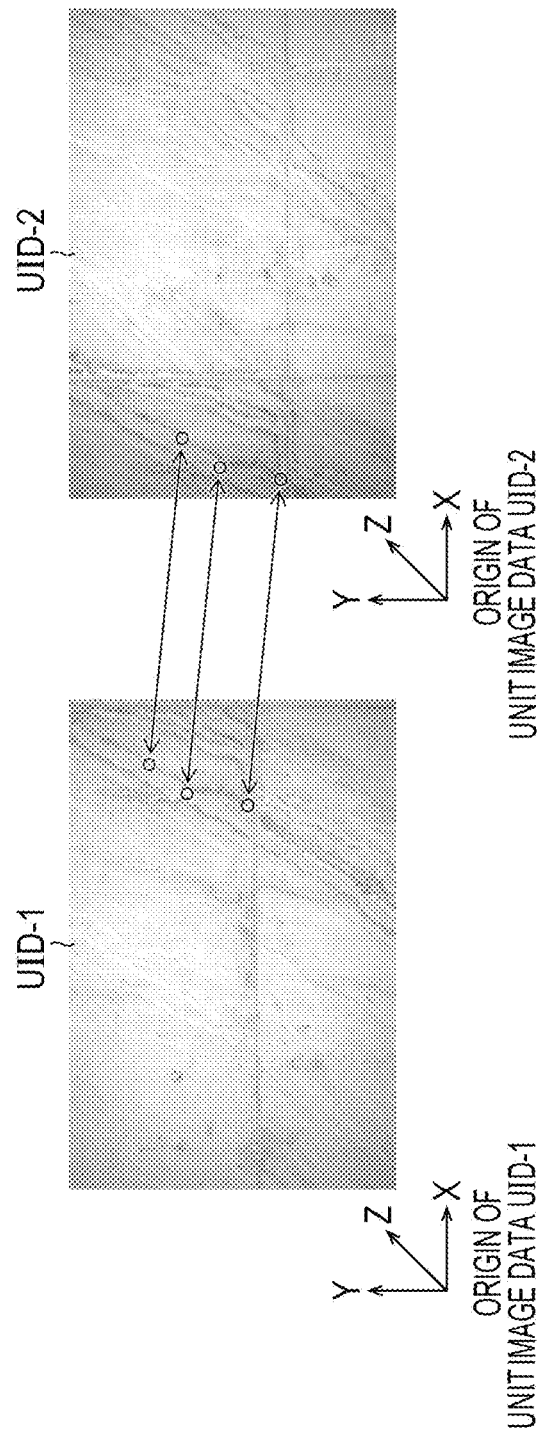
FIG. 16 is a diagram describing creation of another three-dimensional point group.

FIG. 16 illustrates two pieces of unit image data, namely, unit image data UID-1 and unit image data UID-2, which are selected as desired from image group data, in respective camera coordinate systems. The camera coordinate systems are coordinate systems of the imaging device 200, with the origin at the center of the lens.

The unit image data UID-1 and the unit image data UID-2 are obtained at different imaging positions, and the origins of the respective camera coordinate systems are different. In the unit image data UID-1 and the unit image data UID-2, each point at the coordinates (x, y, z) has values (R, G, B). Feature points, as indicated by arrows, are extracted from each of the unit image data UID-1 and the unit image data UID-2. The relationship between the feature points of the unit image data UID-1 and the feature points of the unit image data UID-2 is obtained.

Figure 17:
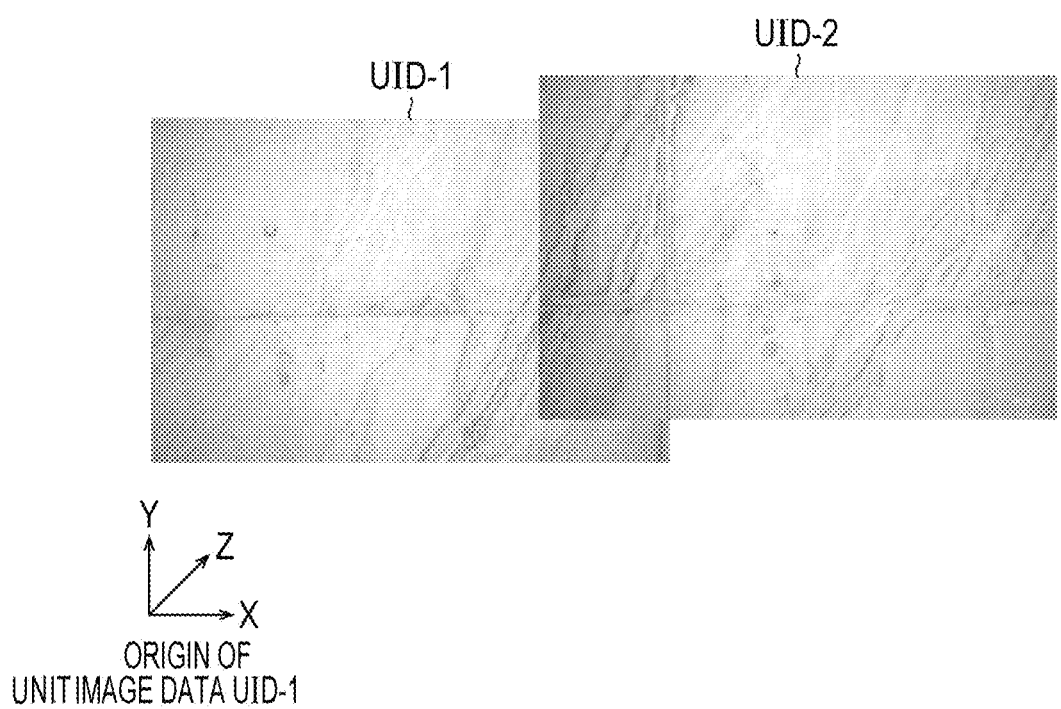
FIG. 17 is a diagram describing creation of another three-dimensional point group.

In the case where the relationship between the feature points of the unit image data UID-1 and the feature points of the unit image data UID-2 is recognized, as illustrated in FIG. 17, the unit image data UID-2 can be projected onto the space of the camera coordinate system of the unit image data UID-1.

The processing described above is performed on the unit image data UID belonging to the estimated image group data of the plane PL. As a result, a point group can be collected as a model in the space of one camera coordinate system.

Finally, point group information that is obtained by SfM and that is adjacent to the plane PL, and the point group collected in the processing described above can be used to create the three-dimensional point groups corresponding to the target object illustrated in FIG. 15 in a manner similar to that in the first embodiment.

Since the unit image data UID is reduced in the image group data, the load of processing using the image data ID is small. Since the plane PL is estimated in the image group data, the relationship of feature points between the pieces of unit image data UID can be easily obtained.

In this embodiment, when the time taken to process an image obtained by imaging with an overlap rate of 90% is set to "1", panoramic image synthesis can be performed with an overlap rate of 30% by using plane estimation. When images of the same area are to be captured, the ratio of the number of images required with an overlap rate of 90% to an overlap rate of 30% in the lateral direction is about 7:1. This is because the image-capturing area increases by 70% as the imaging area increases by 10%. In consideration of length×width, 49:1 is obtained. If it is assumed that the processing time linearly increases with the number of images, the processing time in this embodiment can be greatly reduced such that 1/49=0.02, compared to the related art.

Hardware for implementing an image processing apparatus according to the present invention can be constituted by various processors. The various processors include a CPU (Central Processing Unit), which is a general-purpose processor that executes a program to function as various processing units, a programmable logic device (PLD), which is a processor whose circuit configuration can be changed after manufacture, such as an FPGA (Field Programmable Gate Array), a dedicated electric circuit, which is a processor having a circuit configuration designed specifically to execute specific processing, such as an ASIC (Application Specific Integrated Circuit), and so on. A single processing unit constituting an image display device may be configured by one of the various processors described above or may be configured by two or more processors of the same type or different types. For example, the single processing unit may be configured by a plurality of FPGAs or a combination of a CPU and an FPGA. Alternatively, a plurality of processing units may be configured by a single processor. Examples of configuring a plurality of processing units by a single processor include, first, a form in which, as typified by a computer such as a client and a server, the single processor is configured by a combination of one or more CPUs and software and the processor functions as a plurality of processing units. The examples include, second, a form in which, as typified by a system on chip (SoC) or the like, a processor is used in which the functions of the entire system including the plurality of processing units are implemented by a single IC (Integrated Circuit) chip. As described above, the various processing units are configured using one or more of the various processors described above as a hardware structure. The hardware structure of these various processors can be implemented by, more specifically, an electric circuit (circuitry) made by a combination of circuit elements such as semiconductor elements.

While the present invention has been described, the present invention is not limited to the above examples and may be improved or modified in various ways without departing from the scope of the present invention.

From the foregoing description, an image processing apparatus according to appendix 1 below is achievable.

[Appendix 1]

An image processing apparatus including a processor, the processor being configured to:

acquire, from an image data acquisition device and a three-dimensional data acquisition device, a plurality of pieces of unit image data including a plurality of pieces of image data and a plurality of pieces of three-dimensional data that are associated with each other, for a target object, for each angle of view of the image data acquisition device;

estimate a plane, based on a plurality of the three-dimensional data included in the plurality of pieces of unit image data;

acquire image group data by grouping a plurality of pieces of the image data included in a plurality of pieces of the unit image data belonging to the estimated plane; and select image data necessary to form the plane from among the plurality of pieces of image data included in the image group data.

REFERENCE SIGNS LIST 1 image processing system
100 image processing apparatus
110 operation unit
120 display unit
130 processing apparatus microcomputer
132 unit image data acquisition unit
134 plane estimation unit
136 image group data acquisition unit
138 image data selection unit
140 control unit
200 imaging device
202 image data acquisition device
204 three-dimensional data acquisition device
250 controller
300 mobile object
310 propeller drive motors
312 motor driver
316 sensor unit
318 airframe-side wireless communication unit
330 mobile-object microcomputer
332 control unit
334 movement control unit
336 airframe-side wireless communication control unit
338 camera control unit A, B, C structure
CID composite image data
ID, ID-1, ID-2 image data
IG image group
PC point group
PL plane
PQ data
UID, UID-1, UID-2 unit image data

What is claimed is:

1. An image processing method comprising:
acquiring, from an image data acquisition device and a three-dimensional data acquisition device, a plurality of pieces of unit image data including a plurality of pieces of image data and a plurality of pieces of three-dimensional data that are associated with each other, for a target object, for each angle of view of the image data acquisition device;
estimating a plane, based on the plurality of pieces of three-dimensional data included in the plurality of pieces of unit image data;
acquiring image group data by grouping a plurality of pieces of the image data included in a plurality of pieces of the unit image data belonging to the estimated plane; and
selecting image data necessary to form the plane from among the plurality of pieces of image data included in the image group data.

2. The image processing method according to claim 1, wherein the image data and the three-dimensional data are simultaneously acquired.

3. The image processing method according to claim 1, wherein the three-dimensional data acquisition device includes one of a stereo camera, a laser scanner, or a time-of-flight camera.

4. The image processing method according to claim 2, wherein the three-dimensional data acquisition device includes one of a stereo camera, a laser scanner, or a time-of-flight camera.

5. The image processing method according to claim 1, wherein the plurality of pieces of image data are two-dimensional color image data.

6. The image processing method according to claim 2, wherein the plurality of pieces of image data are two-dimensional color image data.

7. The image processing method according to claim 3, wherein the plurality of pieces of image data are two-dimensional color image data.

8. The image processing method according to claim 4, wherein the plurality of pieces of image data are two-dimensional color image data.

9. The image processing method according to claim 1, wherein in estimating a plane, estimating the plane after segmentation of the plurality of pieces of three-dimensional data is included.

10. The image processing method according to claim 2, wherein in estimating a plane, estimating the plane after segmentation of the plurality of pieces of three-dimensional data is included.

11. The image processing method according to claim 3, wherein in estimating a plane, estimating the plane after segmentation of the plurality of pieces of three-dimensional data is included.

12. The image processing method according to claim 4, wherein in estimating a plane, estimating the plane after segmentation of the plurality of pieces of three-dimensional data is included.

13. The image processing method according to claim 5, wherein in estimating a plane, estimating the plane after segmentation of the plurality of pieces of three-dimensional data is included.

14. The image processing method according to claim 6, wherein in estimating a plane, estimating the plane after segmentation of the plurality of pieces of three-dimensional data is included.

15. The image processing method according to claim 7, wherein in estimating a plane, estimating the plane after segmentation of the plurality of pieces of three-dimensional data is included.

16. The image processing method according to claim 8, wherein in estimating a plane, estimating the plane after segmentation of the plurality of pieces of three-dimensional data is included.

17. The image processing method according to claim 1, wherein in selecting image data, selection based on an overlapping rate of image data for forming the plane is included.

18. The image processing method according to claim 2, wherein in selecting image data, selection based on an overlapping rate of image data for forming the plane is included.

19. An image processing apparatus comprising:
a processor configured to:
acquire, from an image data acquisition device and a three-dimensional data acquisition device, a plurality of pieces of unit image data including a plurality of pieces of image data and a plurality of pieces of three-dimensional data that are associated with each other, for a target object, for each angle of view of the image data acquisition device;
estimate a plane, based on the plurality of pieces of three-dimensional data included in the plurality of pieces of unit image data;
acquire image group data by grouping a plurality of pieces of the image data included in a plurality of pieces of the unit image data belonging to the estimated plane; and
select image data necessary to form the plane from among the plurality of pieces of image data included in the image group data.

20. A non-transitory computer readable recording medium storing an image processing program for causing a computer to execute the image processing method according to claim 1.

* * * * *